United States Patent [19]

Otala

[11] 3,893,023

[45] July 1, 1975

[54] MAGNETIC BUBBLE DEVICE FOR VISUALIZING MAGNETIC FIELD PATTERNS

[75] Inventor: Matti Niilo Tapani Otala, Oulu, Finland

[73] Assignee: U.S. Philips Corporation, New York, N.Y.

[22] Filed: Jan. 7, 1974

[21] Appl. No.: 431,544

[30] Foreign Application Priority Data

Feb. 12, 1973 Netherlands ....................... 7301931

[52] U.S. Cl. ................................ 324/43 R; 340/174

[51] Int. Cl. ............................................ G01r 33/02

[58] Field of Search ......... 324/43 R, 43 L; 350/151; 340/174 TF

[56] References Cited

UNITED STATES PATENTS

| | | | |
|---|---|---|---|
| 3,626,394 | 12/1971 | Nelson et al. | 350/151 |
| 3,742,471 | 6/1973 | Mikami | 340/174 TF |
| 3,815,107 | 6/1974 | Almasi | 340/174 TF |

OTHER PUBLICATIONS

Fisher, A., The Strange World of Magnetic Bubbles; Pop. Scien., Feb. 1970; pp. 65–67.

Comstock et al., Measuring Magnetic Fields from Recording Heads; IBM Tec. Bull., Vol. 13, No. 4, Sept. 1970, pp. 1006–1007.

Bogholtz et al., Display System Using Orthoferrite etc.; IBM Tec. Bull., Vol. 13, No. 11, Apr. 1971, pp. 3455.

Romankiw et al., Mag. Mater. Ed.; IBM Tec. Bull., Vol. 14, No. 9, Feb. 1972, p. 2579–2580.

Bobeck, The Magnetic Bubble, Bell Lab. Record; Vol. 48, pp. 162–169.

*Primary Examiner*—Robert J. Corcoran
*Attorney, Agent, or Firm*—Frank R. Trifari; Simon L. Cohen

[57] ABSTRACT

A device for visualizing magnetic field patterns comprising a first layer having a periodic structure of magnetic "bubbles" which are maintained by the field of a second permanent magnetic layer. Variations in an external field influence the size of the surface of the "bubble." Variations in the size of the surface are made visible by means of a magneto-optical detection device.

7 Claims, 2 Drawing Figures

MAGNETIC BUBBLE DEVICE FOR VISUALIZING MAGNETIC FIELD PATTERNS

The invention relates to a device for visualizing magnetic field patterns.

The study of magnetization patterns and flux patterns has so far usually been carried out by making said patterns visible by means of "Bitter" methods. In these methods a suspension comprising ferromagnetic particles is used which is either spread on the surface to be investigated (for example a magnetic tape), or is provided, while enclosed between two diaphragms, in the immediate proximity of the surface (U.S. Pat. No. 3,013,206). The former method is time-consuming. Not only must the suspension first be provided on the surface, but after termination of the investigation it must also be removed again. The latter method does not exhibit this drawback, but its drawback is that the suspension is separated from the surface to be investigated by a diaphragm so that a magnetization pattern or flux pattern to be investigated cannot be observed to the most minute details. Moreover, a drawback of both methods is that the gradient of the investigated magnetic field is made visible and not the field itself.

In addition to "Bitter" methods, magneto-optical methods may also be used to make magnetization patterns visible. For example, from British Patent Specification No. 833,930 a method is known which is based on the Kerr effect according to which the plane of polarization of a linearly polarized light beam experiences a rotation when same is reflected at a magnetized medium. The rotation of the plane of polarization takes place to a greater or smaller extent to the right or to the left, depending upon whether the magnetization responsible for the rotation influences the light beam with a positive or a negative polarity and upon the value of the magnetization. When an analyzer is placed in the light path of such a reflected light beam, the analyzed light beam will have various intensities dependent on the occurred rotation of the plane of polarization. A drawback of visualizing magnetization patterns magneto-optically, however, is that not every surface to be investigated is in itself smooth enough and that not every material shows a sufficiently large magneto-optic rotation to provide distinct intensity differences. For example, the magnetic coating of a magnetic tape has a granular structure; as a result of the considerable extent of scattering of the reflected light beam which is inherent to said structure and the generally small magneto-optical rotation of the materials used for such coatings, no usable magneto-optic effect is obtained. When such a surface is to be made better suitable for magneto-optical visualization by polishing it, then the drawback occurs that the original surface actually disappears as a result of which the method obtains a destructive character.

An additional drawback associated with both the "Bitter" method and the said magneto-optical method is that "spatial" magnetic fields, for example the field in the gap of a magnetic head, cannot be made visible with said methods.

It is an object of the invention to provide a device of the above-mentioned type which does not exhibit the said drawbacks.

For that purpose the device according to the invention is characterized in that it comprises a first layer of a magnetizable material having a uniaxial magnetic anisotropy, which layer is magnetized in a direction normal to the plane of the layer under the influence of a second layer of a permanent magnetic material extending on one side of the first layer, the first layer comprising a periodic structure of magnetic domains the direction of magnetization of which is opposite to the direction of magnetization of the remainder of the first layer, a magneto-optical detection device being present for irradiating the first layer with a beam of linearly polarized light and analyzing the direction of polarization of the reflected or transmitted beam.

It is known that the flat surface of magnetic domains as described above, which domains are maintained by the field of the second layer, is dependent on the external field. The flat surface of each magnetic domain which belongs to the periodic structure thus is a measure of the local external field. By visualizing the domain structure magneto-optically, a direct image is thus obtained of the external magnetic field in which or near which the layer having the periodic structure of magnetic domains is present.

So far a method of directly visualizing magnetic fields had not been known.

The relation between the size of the surface of a magnetic domain and the intensity of the external field is to a first approximation linear. By choosing a suitable value of the magnetic field produced by the permanent magnetic layer approximately in the middle between the strength of the collaps field of the magnetic domains and the run-out field, variations of the external field in either direction (i.e., larger and smaller) can be made visible.

The device according to the invention is preferably used so that the layer which comprises the periodic structure of magnetic domains faces the field pattern to be investigated and the domain structure is observed magneto-optically through the permanent magnetic layer. For that purpose, an embodiment of the device according to the invention is characterized in that apertures are provided in the layer of permanent magnetic material opposite to the magnetic domains in the first layer. Through these apertures, a light beam may be caused to impinge upon the flat surface of the magnetic domains and the reflected beam may be observed. The apertures preferably taper in the direction of the first layer. This presents the possibility of causing the light beam to be incident at an angle differing slightly from 90° as a result of which the incident and the reflected beams enclose a small angle with each other. The provision of the apertures in the permanent magnetic layer presents the additional advantage that the magnetic domains in the first layer will be present opposite to the apertures in the second layer. Then it is not necessary to create special pinning points for the magnetic domains which must be ordered in a periodic structure, for example, by providing impurities in the material of the first layer itself.

Various materials may be used for the first layer. The diameter of the magnetic domains depends inter alia upon the material used. Materials having magnetic domains which have a diameter between 0.5 and 50 microns are preferably used so as to obtain a lattice structure having a resolving power which is suitable for the end in view.

Another reason which may determine the choice of the material is the value of the magneto-optical rotation. It is an additional advantage of the invention that for visualizing magnetization and flux patterns a "Conversion" layer may be used having a large magneto-optical rotation as a result of which one does not depend upon the magneto-optical properties of the material to be tested.

The device according to the invention is particularly suited to visualize magnetic field patterns by means of the screen of a television display tube.

For that purpose, a further embodiment of the device according to the invention is characterized in that the magneto-optical detection device is designed for the point-wise scanning of the first layer. A photoelectric cell being present in the light path of the beam originating from the layer, the output signal of said photoelectric cell being supplyable, together with a synchronization signal, to a picture display device.

The invention will be described in greater detail with reference to the drawing.

Figure 1:
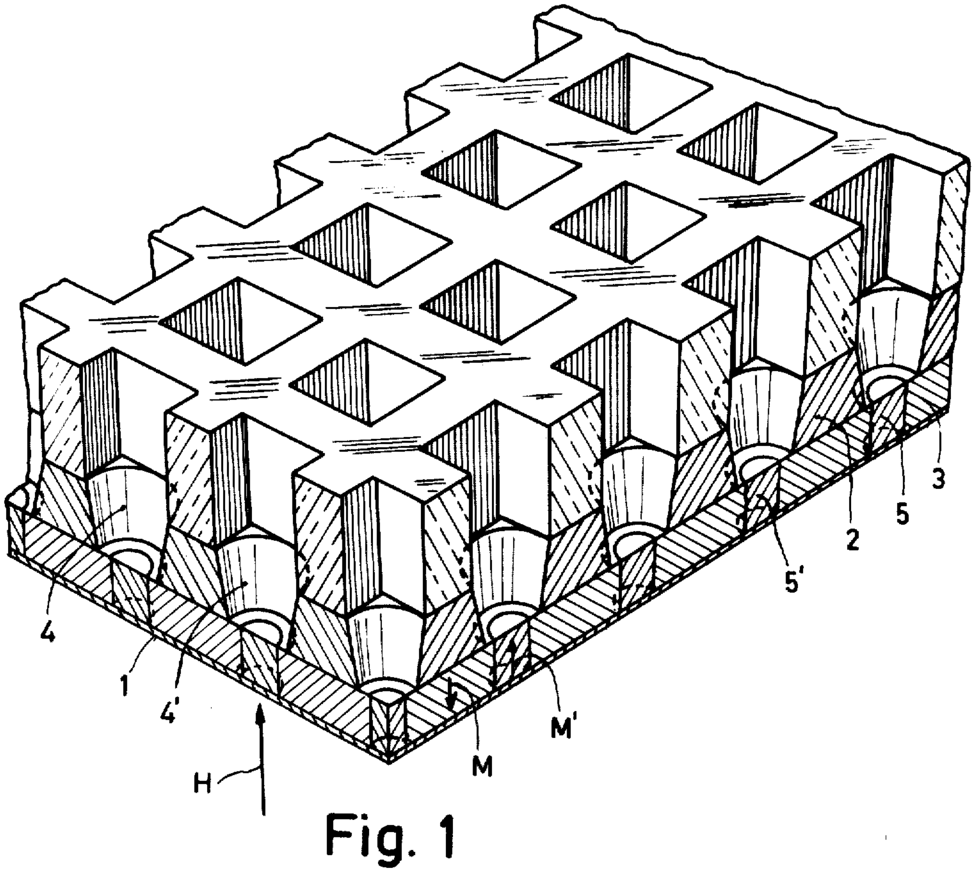
FIG. 1 is a partial side elevation and a partial sectional view of a structure of layers having a lattice of cylindrical magnetic domains.

The structure of layers shown in FIG. 1 consists of a layer 2 of a permanent magnetic material which is reinforced by means of a structure of beams. A monocrystalline layer 3 of a magnetic material having a uniaxial magnetic anisotropy is provided on the layer 2. This layer 3 may be provided, for example, by epitaxy from the liquid phase on a suitable substrate with is etched away afterwards. The magnetic material may be, for example, a rare earth garnet or a rare earth orthoferrite. When the layer 3 is so thin that a light beam to be used upon reading can penetrate into it entirely, it is useful, in order to increase the sensitivity, to vapour-deposit a reflecting layer 1 on the lower side of the layer 3. Under the influence of the field of the permanent magnetic layer 2, cylindrical magnetic domains 5, 5' ... having a magnetization direction M' which is directed opposite to the direction of magnetization M of the remainder of the layer 3 exist in the layer 3. A regular pattern of small holes 4, 4' ... is etched in the layer 2. The cross-section of said holes at the area of the layer 3 is from two to three times as large as the cross-section of the cylindrical magnetic domains 5, 5' ... Each of said domains occupies a place opposite to one of the holes 4, 4' ... The layer 3 can easily comprise a matrix of 500 × 500 domains having a cross-section of 6 μm (a 500 × 500 matrix can be read in a TV-system). When the holes in the layer 2 are provided in the corner points of squares having sides of 25 μm, the required structure of layers thus has outer dimensions of 12.5 × 12.5 mm. Dependent upon the application in view, a material may be chosen for the layer 3 in which domains can exist having cross-sections which lie between 0.5 and 50 μm. The cross-section of the domains varies under the influence of the external field H. For that purpose, the strength of the field produced by the permanent magnetic layer 2 at the area of the layer 3 must have a suitable value between the strength of the collapse field of the cylindrical magnetic domains and the strength of the run-out field. It is to be noted that the flux lines originating from the layer 2 close through the layer 3, so that the field originating from the layer 2 is very small on the other side of the layer 3, and influences a field configuration to be tested to a minimum extent.

Figure 2:
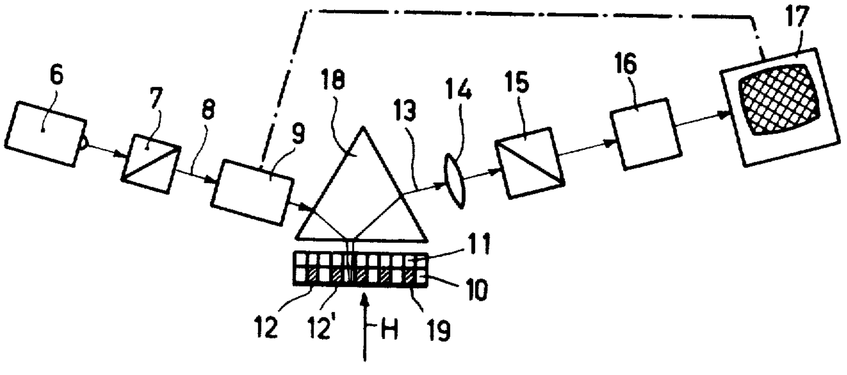
FIG. 2 shows a block diagram of a device for visualizing magnetic fields.

As explained above, the cross-section of each domain in the layer 3 provides information on the local external field. This information can be visualized magneto-optically on a television display tube. A block diagram of the device to be used for this purpose is shown in FIG. 2.

A beam of polarized light 8 is produced by the light source 6 (for example, a laser) and the first polarizer 7. By means of the deflection device 9 and the prism 18 the domain pattern in the layer 10 is scanned point-wise by means of said beam 8. This domain pattern is maintained by the field of the permanent magnetic layer 11. The light beam 8 impinges upon the layer 10 through apertures 12, 12' .... It is to be noted that the angle of incidence, as well as the angle of reflection, are strongly exaggerated in the drawing; it actually is substantially 90°. The beam 13 reflected by the layer 19 impinges upon the photosensitive cell 16 via the lens 14 and the second polarizer 15. Dependent upon the size of the domain which reflects the beam, the plane of polarization of the beam is rotated to a greater or smaller extent. The cell 16 produces a signal which is proportional to the size of the surface of the scanned domain. Together with a synchronization signal derived from the deflection device 9, said signal is supplied to the picture display device 17. On this device the picture of the magnetic field in question is made visible.

It is to be noted that when the periodic cylindrical magnetic domain structure is placed in too strong an external field, a number of domains or all the domains will disappear. In order to produce them again, it is sufficient to touch the layer 10 with a permanent magnet.

Application

The device for visualizing magnetic fields according to the invention may be used for a variety of applications, for example:

1. For investigating flux patterns of magnetic heads.
2. For visualizing magnetization patterns on magnetic tapes and discs.
3. For studying magnetic domains.
4. For measuring susceptibility variations in inhomogeneous materials.
5. For editing video tapes. It has so far been a great problem in splicing pieces of video tape together to accurately follow the magnetic tracks on the tape.
6. For mapping the field of permanent magnets.

What is claimed is:

1. A device for visualizing magnetic field patterns, comprising a first layer of a magnetizable material having a uniaxial magnetic anisotropy, which layer is magnetized in a direction normal to the plane of the layer under the influence of a second layer of a permanent magnetic material juxtaposed one side of the first layer, the first layer comprising a periodic structure of magnetic domains the direction of magnetization of which is opposite to the direction of magnetization of the remainder of the first layer, said second layer comprising a means for maintaining the magnetic domains fixed in said periodic structure, and a magneto-optical detection means for irradiating the first layer with a beam of linearly polarized light and for analyzing the direction of polarization of the resulting beam from said first layer.

2. A device as claimed in claim 1, wherein the layer of permanent magnetic material produces a field in said first layer having a strength which lies approximately in the middle between the strength of the collapse field and the strength of the run-out field of the magnetic domains.

3. A device as claimed in claim 1, wherein apertures are provided in the layer of permanent magnetic material opposite to the magnetic domains in the first layer for maintaining said domains fixed in said periodic structure, and for providing optical paths through said permanent magnetic material between the magneto-optical detection means and the domains in the first layer.

4. A device as claimed in claim 3, wherein the apertures taper in the direction of the first layer.

5. A device as claimed in claim 1, wherein the magnetic domains have a diameter which lies between 0.5 and 50 microns.

6. A device as claimed in claim 1, wherein the magneto-optical detection device comprises means for point-wise scanning the first layer, a photoelectric cell being present in the light path of the beam from the first layer, the output signal of said photoelectric cell being supplyable, together with a synchronization signal from said scanning means to a picture display device.

7. A device as claimed in claim 1, wherein a layer of a reflecting material is present on the side of the first layer opposite to the layer of permanent magnetic material and wherein said magneto-optical detection means is on the same side of the first layer as is the permanent magnetic layer.

* * * * *